United States Patent
Olander Burak et al.

(10) Patent No.: US 8,464,831 B2
(45) Date of Patent: Jun. 18, 2013

(54) NOISE ATTENUATION PANEL AND A GAS TURBINE COMPONENT COMPRISING A NOISE ATTENUATION PANEL

(75) Inventors: Marcus Olander Burak, Göteborg (SE); Lars-Erik Eriksson, Skövde (SE)

(73) Assignee: Volvo Aero Corporation, Trollhättan (SE)

( * ) Notice: Subject to any disclaimer, the term of this patent is extended or adjusted under 35 U.S.C. 154(b) by 0 days.

(21) Appl. No.: 13/496,238

(22) PCT Filed: Sep. 17, 2009

(86) PCT No.: PCT/SE2009/000413
§ 371 (c)(1),
(2), (4) Date: Mar. 16, 2012

(87) PCT Pub. No.: WO2011/034469
PCT Pub. Date: Mar. 24, 2011

(65) Prior Publication Data
US 2012/0168248 A1    Jul. 5, 2012

(51) Int. Cl.
*E04B 1/82* (2006.01)
(52) U.S. Cl.
USPC .......................................... 181/292; 181/290
(58) Field of Classification Search
USPC ................................. 181/292, 290
See application file for complete search history.

(56) References Cited

U.S. PATENT DOCUMENTS

| | | | |
|---|---|---|---|
| 3,640,357 A | 2/1972 | Kitching et al. | |
| 4,562,901 A * | 1/1986 | Junger et al. | 181/285 |
| 4,944,362 A * | 7/1990 | Motsinger et al. | 181/213 |
| 5,041,323 A | 8/1991 | Rose et al. | |
| 6,098,926 A * | 8/2000 | Morgenthaler | 244/119 |
| 6,122,892 A | 9/2000 | Gonidec et al. | |
| 6,135,238 A * | 10/2000 | Arcas et al. | 181/292 |
| 6,179,086 B1 * | 1/2001 | Bansemir et al. | 181/292 |
| 6,182,787 B1 * | 2/2001 | Kraft et al. | 181/292 |
| 6,609,592 B2 * | 8/2003 | Wilson | 181/292 |
| 6,871,725 B2 * | 3/2005 | Johnson | 181/292 |
| 7,401,682 B2 * | 7/2008 | Proscia et al. | 181/290 |
| 2009/0166127 A1 | 7/2009 | Thomas et al. | |

FOREIGN PATENT DOCUMENTS

| | | |
|---|---|---|
| GB | 2026622 A | 2/1980 |
| GB | 2319589 A | 5/1998 |

OTHER PUBLICATIONS

International Search Report tor corresponding International application No. PCT/SE2009/000413.

* cited by examiner

Primary Examiner — Forrest M Phillips
(74) Attorney, Agent, or Firm — WRB-IP LLP

(57) ABSTRACT

A noise attenuation panel includes a first wall, a second wall and partition walls connected to the first and second walls and defining cells between the first and second walls. The first wall is provided with a plurality of through holes. At least two of the cells are interconnected via a communication hole. One of the through holes leads to a first of the at least two interconnected cells and a second of the interconnected cells is configured to prevent any gas flow through the second cell.

17 Claims, 3 Drawing Sheets

NOISE ATTENUATION PANEL AND A GAS TURBINE COMPONENT COMPRISING A NOISE ATTENUATION PANEL

BACKGROUND AND SUMMARY

The present invention relates to a noise attenuation panel comprising a first wall, a second wall and partition walls connected to the first and second walls and defining cells between the first and second walls, wherein the first wall is provided with a plurality of through holes. The invention is further directed to a gas turbine component comprising a noise attenuation panel.

The gas turbine component is configured for application in a gas turbine engine, and especially in an aircraft engine. Thus, the invention is especially directed to a jet engine. Jet engine is meant to include various types of engines, which admit air at relatively low velocity, heat it by combustion and shoot it out at a much higher velocity. Accommodated within the term jet engine are, for example, turbojet engines and turbofan engines. The invention will below be described for a turbofan-engine, but may of course also be used for other engine types.

Said noise attenuation panel is used to reduce the noise of the engine and the fan in operation. Further, the partition walls are often designed in a honeycomb pattern. An advantage with a honeycomb cell type structure is that it is structurally stable. In certain cases, the cells of the honeycomb material act as a Helmholtz resonator when they communicate with the outside. This provides an acoustic panel which absorbs the noise over a certain range of frequencies.

The Helmholtz type of liner (panel) is well known for its good sound suppressing qualities. Its impedance may be regarded as a mass-spring-damper system where the air in the neck serves as the mass, the volume of air in the body as a spring and viscous forces in the neck (through hole) together with nonlinear effects serves as the damping. The drawback of this type of liner is that the resonance frequency is determined, by the ratio between the cross-area/depth ratio of the neck and the volume of the body. This means that in order to make a low frequency liner the neck must have a small diameter and a great depth in combination with a large body volume.

The noise is primarily generated between the fan and an arrangement of outlet guide vanes positioned downstream of the fan. It is for example known to use said noise attenuation panel in a circumferential inner wall defining the air inlet upstream of the fan.

The noise attenuation panel is designed depending on the aircraft engine type and design and a desire to attenuate noise in certain operations. For example, there is often a desire to attenuate noise during takeoff. Further, one effect of some modern aircraft engines is that noise of lower frequencies than before is generated during said defined operation. Further, there is a desire to use sound attenuation panels in more positions in the aircraft engine.

It is desirable to achieve a noise attenuation panel, which is configured to attenuate low frequency tonal noise with a minimal depth requirement.

According to an aspect of the present invention, in a noise attenuation panel at least two of said cells are interconnected via a communication hole, that one of said through holes leads to a first of said at least two interconnected cells and that a second of said interconnected cells is configured to prevent any gas flow through the, second cell. The communication hole is preferably provided in the partition wall between the cells Thus, the panel is configured to allow a gas flow through the first cell via said through hole and said communication hole. Further, said second cell is closed and is only communicating with the surroundings via said communication hole. In other words, the part of the first wall defining the second cell is devoid of through holes.

More specifically, both a part of the first wall defining the second cell and a part of the second wall defining the second cell are continuous thereby forming closed opposite sides of the second cell. Further, the second cell is only in communication with an external environment via a single adjacent cell of said interconnected cells via the communication hole. The communication hole is preferably arranged in a partition wall in common with said adjacent cell.

In this way, the panel acts as a series of helmholtz resonators with a theoretical resonance frequency of a quarter wavelength. This is not the full physicality due to a small modification of the resonant frequency due to the spring-mass-damper system of the cells. This slows down the reaction of the system, additionally lowering the resonance frequency.

The resonance frequency of the panel will be lower for a cell structure with a specific depth. More specifically, the resonance frequency of the panel depends on an efficient distance from die through hole (inlet hole) to an fend of the interconnected cells. By interconnecting a plurality of cells in series and designing a last cell (said second cell) to prevent any gas flow therethrough, the resonance frequency is lowered for a cell structure with a specific-depth. This design creates conditions for designing a relatively thin panel and thereby using the panel in positions with space constraints, such as in a guide vane.

In other words, the noise attenuation panel is generally composed of two metal or composite walls or skins and a central section made from metal or composite cellular material.

According to a preferred embodiment, said-partition walls-form a honeycomb structure. In this way, a structurally stable design is achieved, which creates conditions for, withstanding the pressure conditions at its defined position in the gas turbine engine.

According to a further preferred embodiment; at least three cells are interconnected via communication holes.

This creates conditions for achieving a longer distance between the inlet hole (the through hole in the first wall) to the first cell and an end wall in the last cell (the second cell) in the series of interconnected cells.

According to a development of the last-mentioned embodiment, the first cell forms an end cell in said at least three interconnected cells. In this way, a longer distance is achieved between the inlet hole (through hole in the first wall) to the first cell and an end wall in the last cell (the second cell) in the series of interconnected cells.

According to a further development of the last-mentioned embodiment, at least three cells of said at least three interconnected cells are arranged along a straight line. This design further creates conditions for achieving a minimized resonance frequency.

According to a further development of the last-mentioned embodiment, only the first cell in said at least three interconnected cells is provided with a through hole in its associated part of the first wall. This design further creates conditions for achieving a longer distance between the inlet hole (through hole in the first wall) to the first cell and an end wall in the last cell (the second cell) in the series of interconnected cells.

According to a further preferred embodiment, one of said communication holes to the first cell is provided at the opposite end of the partition wall in relation to the first wall. This design further creates conditions for achieving a longer effective distance between the inlet hole (through hole in the first wall) to the first cell and an end wall in the last cell (the second cell) in the series of interconnected cells.

According to a further development of the last-mentioned embodiment, one of said communication holes is provided between the second cell and an intermediate cell between the first and second cells in the interconnected cells in the vicinity of the first wall. This design further creates conditions for achieving a longer distance between the inlet hole (through hole in the first wall) to the first cell and an end wall in the last cell in the series of interconnected cells. More specifically, a second communication hole in the cell series is arranged diagonally opposite the first communication hole in the series. By positioning the communication holes as far apart as possible the time for pressure information to travel is maximized, hence the resonance frequency is minimized. Further, since each passage increases the losses, the damping is increased. Thus, the noise will be more damped with a higher number of communication holes. Thus, the fact that there are communication holes at at least two adjacent partition walls implies that the damping is stronger.

It is also desirable to achieve a gas turbine engine component, which is configured to attenuate low frequency noise.

According to another aspect of the present invention, a gas turbine component comprises at least one noise attenuation panel, wherein the panel comprises a first wall and partition walls connected to the first wall and defining cells, wherein the first wall is provided with a plurality of through holes, characterized in that at least two of said cells are interconnected via a communication hole, that one of said through holes leads to a first of said at least two interconnected cells, and that a second of said interconnected cells is configured to prevent any gas flow through the second cell.

Other advantageous features and functions of various embodiments of the invention are set forth in the following description and in the dependent claims.

BRIEF DESCRIPTION OF THE DRAWINGS

The invention will be explained below, with reference to the embodiment shown on the appended drawings, wherein.

DETAILED DESCRIPTION

Figure 1:
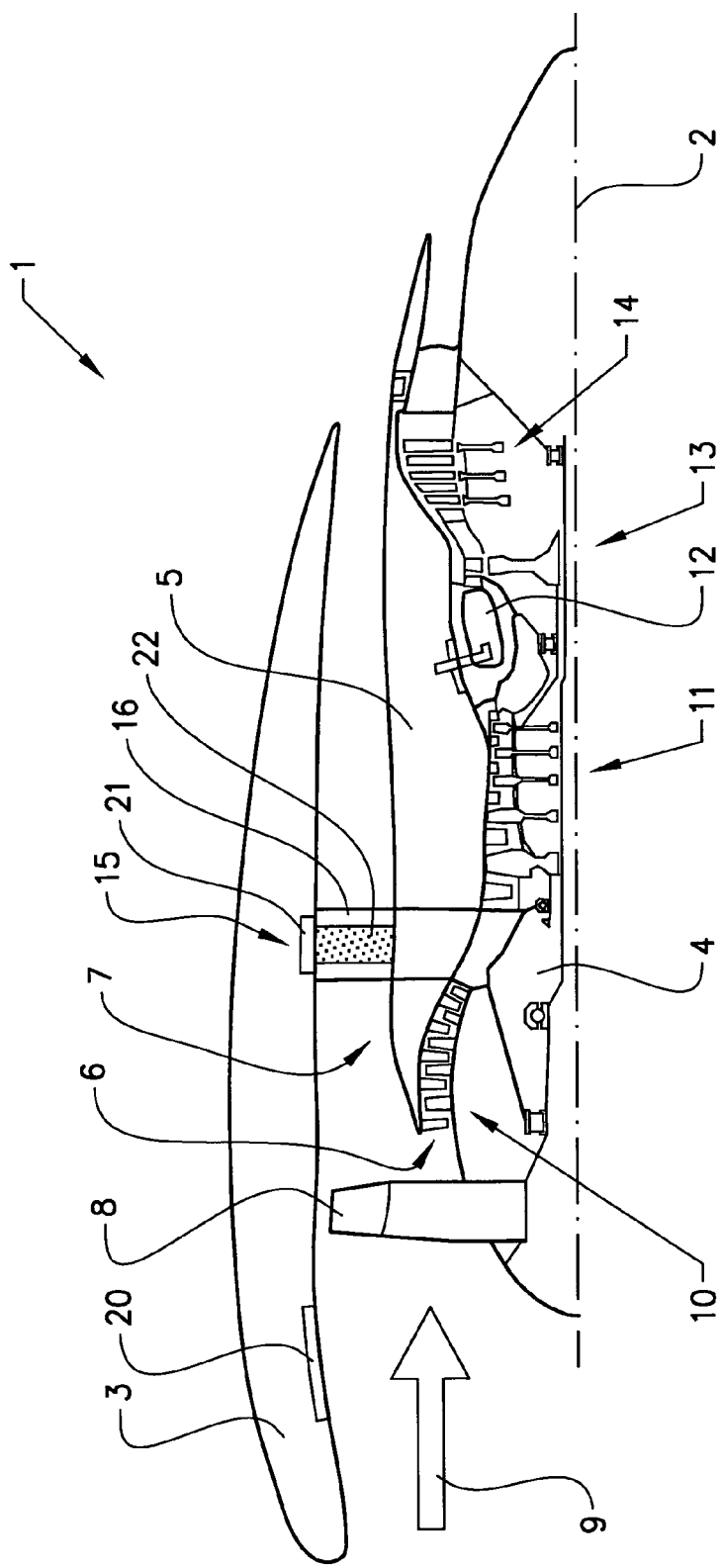
FIG. 1 is a schematic side view of the engine cut along a plane in parallel with the rotational axis of the engine.

The invention will below be described for a turbofan gas turbine aircraft engine 1, which in FIG. 1 is circumscribed about an engine longitudinal central axis 2. The engine 1 comprises an outer casing or nacelle 3, an inner casing 4 and an intermediate casing 5 which is concentric to the first two casings and divides the gap between them into an inner primary gas channel 6 for the compression of air and a secondary channel 7 in which the engine bypass air flows. The casings are in turn made up of a plurality of components in the axial direction of the engine. Thus, each of the gas channels 6, 7 is annular in a cross section perpendicular to the engine longitudinal central axis 2.

The engine 1 comprises a fan 8 which receives ambient air 9, a booster or low pressure compressor (LPC) 10 and a high pressure compressor (HPC) 11 arranged in the primary gas channel 6, a combustor 12 which mixes fuel with the air pressurized by the high pressure compressor 11 for generating combustion gases which flow downstream through a high pressure turbine (HPT) 13 and a low pressure turbine (LPT) 14 from which the combustion gases are discharged from the engine.

A high pressure shaft joins the high pressure turbine 13 to the high pressure compressor 11 to substantially form a high pressure rotor. A low pressure shaft joins the low pressure turbine 14 to the low pressure compressor 10 to substantially form a low pressure rotor. The low pressure shaft 17 is at least in part rotatably disposed co-axially with and radially inwardly of the high pressure rotor.

Figure 2:
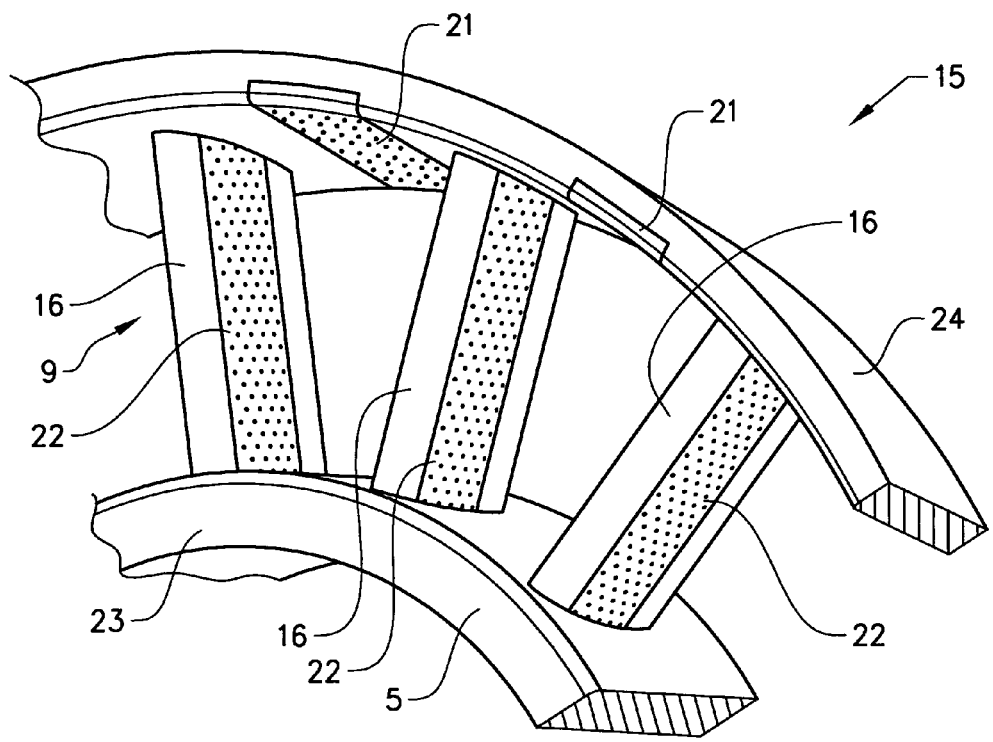
FIG. 2 is a perspective and partly cut view of a housing component in the engine shown in FIG. 1.

A gas turbine component 15 is positioned downstream of the fan 8. The component 15 comprises an inner ring 23, which forms part of the intermediate casing 5, an outer ring 24, which forms part of the outer casing 3, and a plurality of circumferentially spaced radial arms 16, which are rigidly connected to the inner and outer ring, respectively, see FIG. 2. These arms are generally known as struts or outlet guide vanes. The struts 16 are structural parts, designed for transmission of both axial and radial loads and may be hollow in order to house service components.

A first noise attenuation panel arrangement 20 is positioned in a circumferential inner wall defining the air inlet upstream of the fan 8, see FIG. 1. In other words, the noise attenuation panel is arranged at a cylindrical surface of a ring-shaped part defining the gas channel. According to a first embodiment, the first noise attenuation panel arrangement 20 comprises a plurality of circumferentially spaced individual panels (like the arrangement of the panels 21 in FIG. 2). According to an alternative, the first noise attenuation panel arrangement 20 comprises a single annular panel, which may be continuous or discontinuous.

A second noise attenuation panel arrangement 21 is positioned in a circumferential inner wall of said component 15. According to a first embodiment, the second noise attenuation panel arrangement 21 comprises a plurality of circumferentially spaced individual panels, which are positioned between adjacent struts 16, see FIG. 2.

Figure 3:
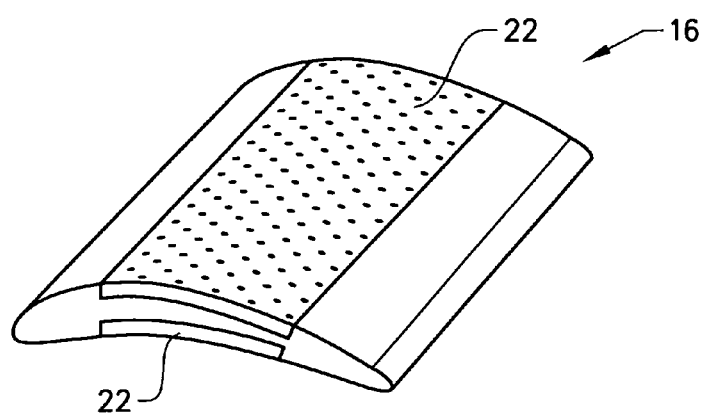
FIG. 3 is a perspective view of a blade of the component in FIG. 2.

A third noise attenuation panel arrangement 22 is positioned in said radial arms 16. In other words, each noise attenuation panel 22 is arranged at a guide blade. According to a first embodiment, the third noise attenuation panel arrangement 22 comprises two panels for each strut 16, see FIG. 3. The panels are arranged on opposite sides of the strut. Thus, according to the airfoil design of the strut shown in FIG. 3, one panel is arranged on a pressure side of the strut and another panel is arranged on a suction side of the strut. Especially in the application of a guide vane, the panels 22 have to be shallow in order to have minimal interference on the strength of the vane.

Each of the noise attenuation panels 20,21,22 mentioned above is arranged in a correspondingly shaped recess in a body of the component so that a top surface of the panel is arranged flush with the adjacent gas turbine component surface. The panel 20,21,22 is configured to not carry any load. Further, the panels 20,21,22 may be attached to a body of the component by any fastening means such as glue, by a mechanical attachment fastener, such as a bolt connection, or in any other way. The dots in the panels 20,21 represent inlet holes (through holes) to an interior of the respective panel, see further below.

Figure 4:
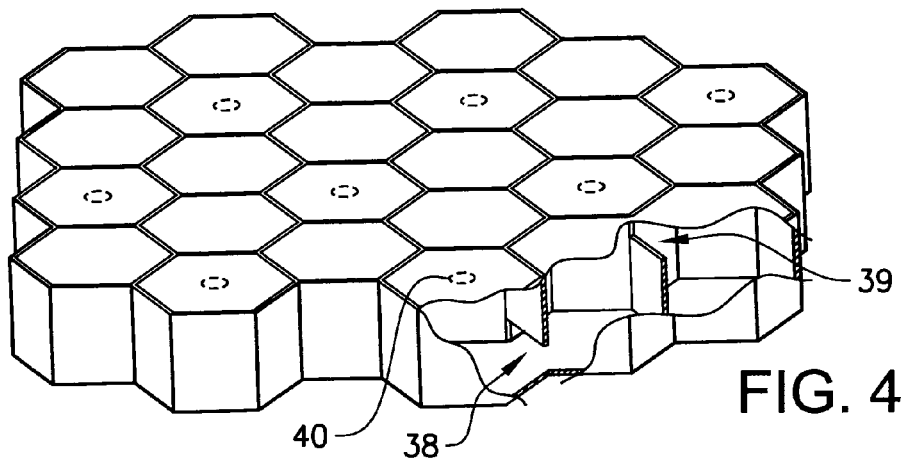
FIG. 4 is perspective and partly cut view of a honeycomb structure of a noise attenuation panel according to a first embodiment.
Figure 5:
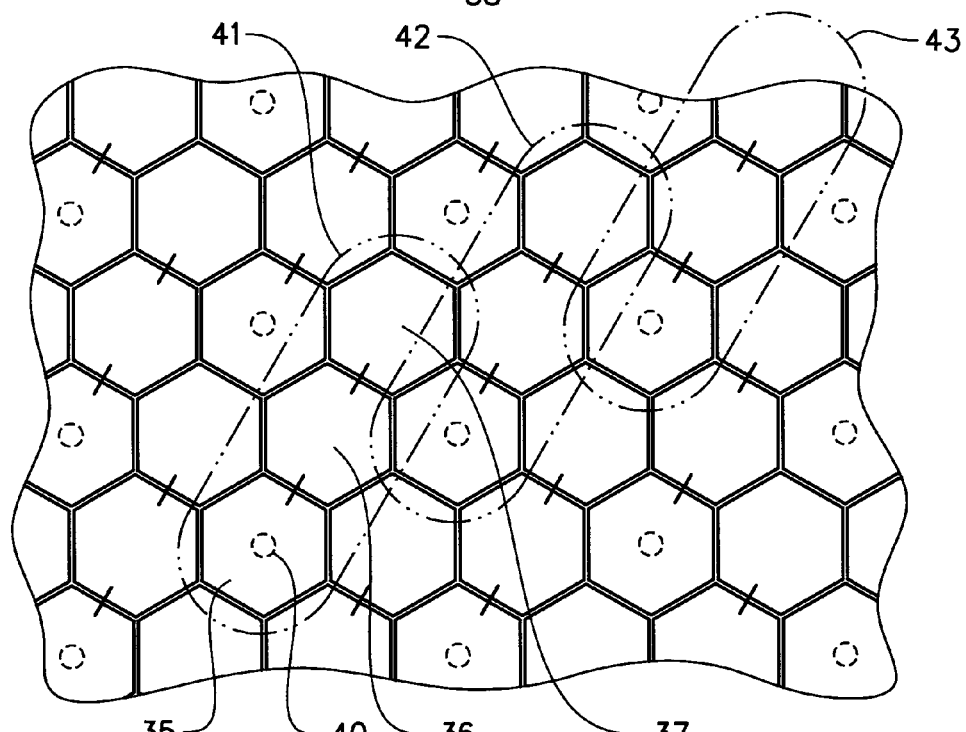
FIG. 5 is a top view of the honeycomb structure of FIG. 4 with indications of internal cell connections.
Figure 6:
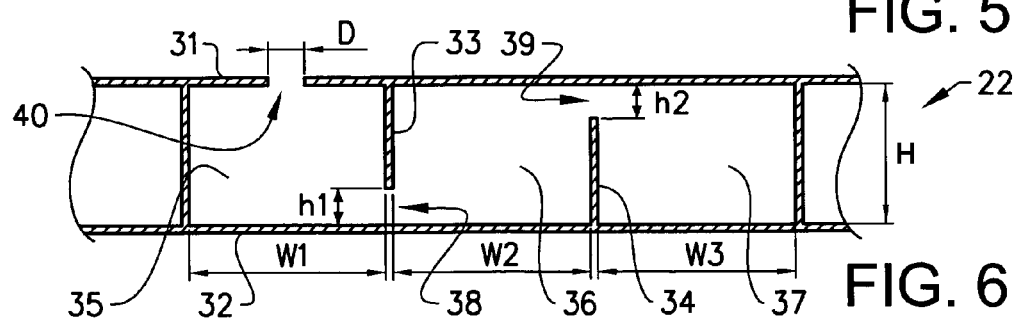
FIG. 6 is a cross sectional side view of a group of three interconnected cells the honeycomb structure of FIG. 4.

The design of the panels will be further described below with reference to FIGS. 4-6. FIG. 6 shows a cross section of each the panel while FIGS. 4 and 5 show the cellular structure in a perspective view and top view, respectively.

Referring now to FIG. 6, the noise attenuation panel 22 comprises a first wall 31, a second wall 32 and partition walls 33,34 connected to the first and second walls and defining cells 35,36,37 between the first and second walls. The first wall 31 forms a top sheet and the second wall 32 forms a back sheet.

The first wall 31 is provided with a plurality of through holes 40. The second wall 32 is continuous thereby forming a closed side of the cells. In other words, the second wall 32 is devoid of through holes. The first and second walls 31,32 are parallel.

The partition walls 33,34 are perpendicular to the first and second walls 31,32. More specifically, the partition walls 33,34 are attached to the first and second walls. The cells 35,36,37 extend from the first wall 31 to the second wall 32. Said partition walls 33, 34 form a honeycomb structure. Thus, the cells are prismatic with a hexagonal section.

The panel 22 has a generally flat shape and is preferably curved in order to match the curvature of the outer surface of the component to which it is attached.

At least two of said cells 35,36,37 are interconnected via a communication hole 38, 39 in the partition wall 33,34 between the cells. A first communication hole 38 is in the internal partition wall 33 common to both the first cell 35 and an adjacent (intermediate) cell 36 in said at least two interconnected cells. A second communication hole 39 is in the internal partition wall 34 common to both the second cell 37 and the intermediate cell 36 in said at least two interconnected cells.

The first cell 35 of said at least two interconnected cells is provided with one of said through holes 40 in its associated part of the first wall 31 thereby allowing a gas flow through the first cell 35 via said through hole 40 and said communication hole 38. From a production perspective, the through hole 40 preferably has a circular shape with a diameter D and may be punched or cut-out. Thus, the first cell 35 is in direct communication with an environment externally of the panel via said through hole 40.

A second 37 of said interconnected cells is configured to prevent any gas flow through the second cell. Thus, said second cell 37 is closed and is only communicating with the surroundings via said communication hole 39 through the partition wall 34. Hence, there is a return gas flow from the second cell in the opposite direction through the communication hole. In other words, the second 37 of said interconnected cells is closed with regard to any direct communication with said external environment so that it is only in communication with said external environment via an adjacent cell 36 of said interconnected cells.

In the gas turbine components described above, each of the noise attenuation panels 20,21,22 is arranged so that a surface of the first wall 31 opposite the cells 35,36,37 faces a gas channel. Thus, the interconnected cells communicate with the gas in the gas channel during operation solely via the through hole 40 to the first cell 35. Further, the panel 22 is arranged so that a surface of the second wall 32 opposite the cells 35,36,37 faces an external surface of a body of the respective component.

According to the shown embodiment, three adjacent cells 35,36,37 are interconnected via communication holes in the partition walls between the cells. Using three cells in series creates conditions for an isotropic configuration of the through holes in the first wall 31. More specifically, the honeycomb structure is configured so that it comprises a plurality of mutually separated cell groups 41,42,43 (see FIG. 5), each comprising a set of said at least two interconnected cells. The cell-groups are divided by continuous partition walls. In other words, two cells in two adjacent cell groups have a partition wall in common.

The first cell 35 forms an end cell in said at least three interconnected cells. The second cell 37 forms a further end cell in said at least three interconnected cells. An intermediate cell 36 is arranged between the first and second cell 35,37, wherein the intermediate cell 36 has one partition wall 33 in common with the first cell 35 and another partition wall 34 in common with the second cell 37. Said three interconnected cells 35,36,37 are arranged along a straight line. Preferably, all cells in each single cell group are arranged along a straight line.

According to the shown embodiment, only the first cell 35 in said at least three interconnected cells is provided with a through hole 40 in its associated part of the first wall 31. Further, one of said communication holes 38 is provided in the partition wall 33 defining the first cell 35 at the opposite end of the partition wall in relation to the first wall 31. Preferably, the communication hole 38 is in the direct vicinity of the second wall 32. In this way, the distance between the through hole 40 and the communication hole 38 is maximized.

Further, one of said communication holes 39 is provided in the partition wall 34 between the second cell 37 and the intermediate cell 36 in the vicinity of the first wall 31. Preferably, the communication hole 39 is in the direct vicinity of the first wall 31. In this way, the distance between the first communication hole 38 and the second communication hole 39 is maximized.

The communication holes 38, 39 are of such a size that that the individual cells do not act purely as a Helmholtz resonator. Instead, the communication holes 38, 39 act more like loss passages in a quarter length resonator. Preferably, the communication holes 38,39 are designed to lower the resonance frequency while maintaining the quarter length resonator characteristics.

According to one example, the size of the communication hole 38 closest to the through hole 40 is substantially larger than the size of the further communication hole 39 in order for the gas to perform a similar effective work at the passages. Preferably, the size of the communication hole 38 closest to the through hole 40 is about twice the size of the further communication hole 39. More specifically, in the case of the communication holes forming slots, a height $h_1$ of the first slot 38 is substantially larger than a height $h_2$ of the second slot 39. Preferably, the height $h_1$ of the first slot 38 is about twice the height $h_2$ of the second slot 39. More specifically, the first slot 38 has a height $h_1$, which is about 20% of a total internal height H (distance between the inner surfaces of the first and second walls 31,32) of the panel.

From a production perspective, the communication holes 38,39 are preferably formed by slots extending a substantial distance of the respective partition wall in its extension direction. Preferably, the slots extend along the complete length of the partition wall in question, wherein the partition wall ends at a distance from the first wall, or second wall, respectively. The slots 38,39 may be achieved by milling a portion of the respective partition wall before the cellular structure is attached to the first wall 31 and second wall 32, respectively.

The interconnected cells in each cell group 41,42,43 are arranged along a straight line and the cell groups are arranged so that the interconnected cells in different cell groups are arranged in parallel with each other (see FIG. 5). Further, the interconnected cells in a first cell group 41 are arranged displaced, or offset, in relation to the interconnected cells in an adjacent second cell group 42 in a direction in parallel with the straight line. This configuration creates further conditions for an isotropic configuration of the through holes in the first wall.

The first wall 31 is preferably perforated with said through holes 40. The porosity of the first wall 31 is about 1-10% and preferably 3-5%. The term "porosity" defines a percentage of the cross section area of the through holes in relation to the total cross sectional area of the first wall. Further, the through holes 40 are isotropically distributed in the first wall 31. In this way, the panel 22 can be arranged in any direction at the gas turbine component in question. In other words, the noise attenuation function will be substantially non-sensitive with regard to the direction of the noise.

The interconnected cells 35,36,37 preferable has the same size. Especially, a width (w) in an extension direction of the cellular structure is the same for the interconnected cells 35,36,37, i.e W1=W2=W3 in FIG. 6.

The invention is not in any way limited to the above described embodiments, instead a number of alternatives and modifications are possible without departing from the scope of the following claims. For example, the invention is not limited to that the cells form a honeycomb structure. Instead, the honeycomb structure may be replaced by other cellular structure, such as a structure with a different polygonal cross sectional shape of the cells, such as quadrangular shape.

Further, each of said first cells in the cell groups may be provided with a plurality of through holes in the associated part of the first wall. Further, the shape of the through hole may vary from the shown circular shape. Likewise, a single partition wall may be provided with a plurality, of communication holes. Further, the shape of the communication hole may vary from the shown slot-like shape.

Further, according to an alternative embodiment, a surface closing the second cell on an opposite side of the second cell with regard to the first wall is formed by an external surface of a body of the component. Thus, according to this alternative embodiment, the panel does not comprise any second wall. Instead, said external surface of a body of the component has the function of closing the second cell (and preferably all cells, in the cell structure).

Further, the invention is of course not limited to arranging cell groups comprising three interconnected cells. Instead an arbitrary number of cells may be coupled in series in each group. For example, each cell group may comprise two or four cells in series. The number of cells in series and the dimensions of the cells set the resonance frequency. Further, the cellular structure in an individual panel may comprise a mix of cell groups with different number of cells.

Further, according to an alternative or complement, at least one of said communication holes may be provided in one of the first and second walls at the position of the partition wall.

The invention claimed is:

1. A noise attenuation panel comprising a first wall, a second wall and partition walls connected to the first and second walls and defining cells between the first and second walls, wherein the first wall is provided with a plurality of through holes, wherein at least two of the cells are interconnected via a communication hole, one of the through holes leads to a first of the at least two interconnected cells, and that second of the interconnected cells is configured to prevent any gas flow through the second cell, and one of the communication holes to the first cell is provided at an opposite end of the partition wall in relation to the first wall.

2. A noise attenuation panel according to claim 1, wherein the partition walls form a honeycomb structure.

3. A noise attenuation panel according to claim 1, wherein at least three cells are interconnected via communication holes.

4. A noise attenuation panel according to claim 3, wherein the first cell forms an end cell in the at least three interconnected cells.

5. A noise attenuation panel according to claim 3, wherein at least three cells of the at least three interconnected cells are arranged along a straight line.

6. A noise attenuation panel according to claim 3, wherein only the first cell in the at least three interconnected cells is provided with a through hole in its associated part of the first wall.

7. A noise attenuation panel according to claim 2, wherein the partition walls define hexagonal cells.

8. A noise attenuation panel according to claim 1, wherein at least three cells are interconnected via communication holes and one of the communication holes is provided between the second cell and an intermediate cell between the first and second cells in the interconnected cells in the vicinity of the first wall.

9. A noise attenuation panel according to claim 1, wherein the through holes are isotropically distributed in the first wall.

10. A noise attenuation panel according to claim 1, wherein the second wall is continuous thereby forming a closed side of the cells.

11. A gas turbine engine component, wherein it comprises at least one noise attenuation panel according to claim 1 and that the noise attenuation panel is arranged so that a surface of the first wall opposite the cells faces a gas channel.

12. A gas turbine engine component according to claim 11, wherein the panel is arranged so that a surface of the second wall opposite the cells faces an external surface of a body of the component.

13. A gas turbine engine component comprising at least one noise attenuation panel, the panel comprising a first wall and partition walls connected to the first wall and defining cells, wherein the first wall is provided with a plurality of through holes, wherein at least two of the cells are interconnected via a communication hole, one of the through holes leads to a first of the at least two interconnected cells, a second of the interconnected cells is configured to prevent any gas flow through the second cell, and one of the communication holes to the first cell is provided at an opposite end of the partition wall in relation to the first wall.

14. A gas turbine engine component according to claim 13, wherein the noise attenuation panel is arranged in a correspondingly shaped recess in a body of the component so that the opposite surface of the first wall is arranged flush with the adjacent gas turbine component surface.

15. A gas turbine engine component according to claim 13, wherein the noise attenuation panel is arranged at as guide blade.

16. A gas turbine engine component according to claim 13, wherein the noise attenuation panel is arranged at a cylindrical surface of a ring-shaped part defining the gas channel.

17. A noise attenuation panel comprising a first wall, a second wall and partition walls connected to the first and second walls and defining cells between the first and second walls, wherein the first wall is provided with a plurality of through holes, wherein at least three of the cells are interconnected via a first communication hole in a first partition wall between a first two of the three interconnected cells and via a second communication hole in a second partition wall between a second two of the three interconnected cells, one of the through holes leads to a first of the at least three interconnected cells, a second of the interconnected cells is configured to prevent any gas flow through the second cell, and the first and second communication holes are provided at opposite ends of the first and second partition walls in relation to the first wall.

* * * * *